(12) United States Patent
Izu

(10) Patent No.: US 11,464,097 B2
(45) Date of Patent: Oct. 4, 2022

(54) ELECTRONIC DEVICE

(71) Applicant: SHARP KABUSHIKI KAISHA, Sakai (JP)

(72) Inventor: Koichi Izu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/027,299

(22) Filed: Sep. 21, 2020

(65) Prior Publication Data

US 2021/0105884 A1    Apr. 8, 2021

(30) Foreign Application Priority Data

Oct. 2, 2019 (JP) .............................. JP2019-181829

(51) Int. Cl.
*H05B 47/125* (2020.01)
*H05B 47/13* (2020.01)
*G01J 5/00* (2022.01)

(52) U.S. Cl.
CPC .......... *H05B 47/125* (2020.01); *G01J 5/0025* (2013.01); *H05B 47/13* (2020.01); *G01J 2005/0077* (2013.01)

(58) Field of Classification Search
CPC ........ A61B 5/1118; H05B 47/11; Y02B 20/40
USPC ..................................................... 340/573.1
See application file for complete search history.

(56) References Cited

U.S. PATENT DOCUMENTS

| 2010/0294915 A1* | 11/2010 | Williams | G01J 5/08 |
| | | | 250/206.1 |
| 2013/0310712 A1* | 11/2013 | Kanemitsu | A61B 5/11 |
| | | | 600/595 |
| 2016/0286630 A1* | 9/2016 | Witzgall | H05B 47/155 |
| 2018/0229735 A1* | 8/2018 | Paek | G08G 1/0962 |
| 2020/0170096 A1* | 5/2020 | Steiner | H05B 47/115 |

FOREIGN PATENT DOCUMENTS

JP         H10-189257 A      7/1998

* cited by examiner

*Primary Examiner* — Fabricio R Murillo Garcia
(74) *Attorney, Agent, or Firm* — ScienBiziP, P.C.

(57) ABSTRACT

An electronic device comprises: a detection unit configured to detect movement of a person; and a control unit configured to, in a case where the detection unit detects a first movement of the person, control an operation unit such that the operation unit is changed from a first state to a second state and maintains the second state for a first predetermined period, wherein, in a case where the detection unit detects a second movement of the person in a predetermined detection period spanning from before an end time of the first predetermined period until after the end time, the control unit controls the operation unit such that the operation unit maintains the second state until an end of a second predetermined period changed from the first predetermined period according to an aspect of the second movement.

5 Claims, 9 Drawing Sheets

ELECTRONIC DEVICE

CROSS-REFERENCE TO RELATED APPLICATIONS

This application claims the benefit of priority to Japanese Patent Application Number 2019-181829 filed on Oct. 2, 2019. The entire contents of the above-identified application are hereby incorporated by reference.

BACKGROUND

Technical Field

The present disclosure relates to an electronic device.

A lighting system is used as an example of an electronic device, as shown in JP H10-189257 A. The lighting system includes a lighting unit that emits light, a control unit that controls the lighting unit, and a detection unit that detects movement of a person. In some lighting systems, a motion sensor as an example of the detection unit detects a first movement of a person, and an on state of the lighting unit is maintained only for a predetermined period.

In such a lighting system, the lighting unit in the on state enters an off state in a case where a second movement of the person is not detected by the detection unit within a predetermined detection period.

On the other hand, in a case where the second movement of the person is detected by the detection unit within the predetermined detection period, the lighting system described above maintains the on state of the lighting unit.

SUMMARY

According to the above-described lighting system, when a person sits on a toilet seat and reads a book in a bathroom with the lighting unit in the on state, for example, the detection unit may not detect movement of the person. Further, even when a person polishes a shoe at an entrance with the lighting unit in the on state, the detection unit may not detect movement of the person.

In these cases, after a lapse of a predetermined detection period, the lighting unit enters the off state. Thus, after the lighting unit enters the off state, the person sitting on the toilet seat or in the entrance turns on the lighting unit again by waving their hand or shaking their head as the second movement described above, for example.

In other words, the on state of the lighting unit cannot be maintained unless a person near the lighting unit repeatedly performs the second movement each time an end time of the predetermined detection period passes or each time the end time of the predetermined detection period approaches. Therefore, much time and effort are required in order to keep the lighting unit in the on state, that is, in order to keep the electronic device in the same state.

An object of an aspect of the present disclosure is to provide an electronic device that does not require much time and effort in order to maintain a state.

An electronic device according to an aspect of the present disclosure includes a detection unit configured to detect movement of a person and a control unit configured to, in a case where the detection unit detects a first movement of the person, control an operation unit such that the operation unit is changed from a first state to a second state and maintains the second state for a first predetermined period, in which, in a case where the detection unit detects a second movement of the person in a predetermined detection period spanning from before an end time of the first predetermined period until after the end time, the control unit controls the operation unit such that the operation unit maintains the second state until an end of a second predetermined period changed from the first predetermined period according to an aspect of the second movement.

BRIEF DESCRIPTION OF DRAWINGS

The disclosure will be described with reference to the accompanying drawings, wherein like numbers reference like elements.

DESCRIPTION OF EMBODIMENTS

Figure 1:
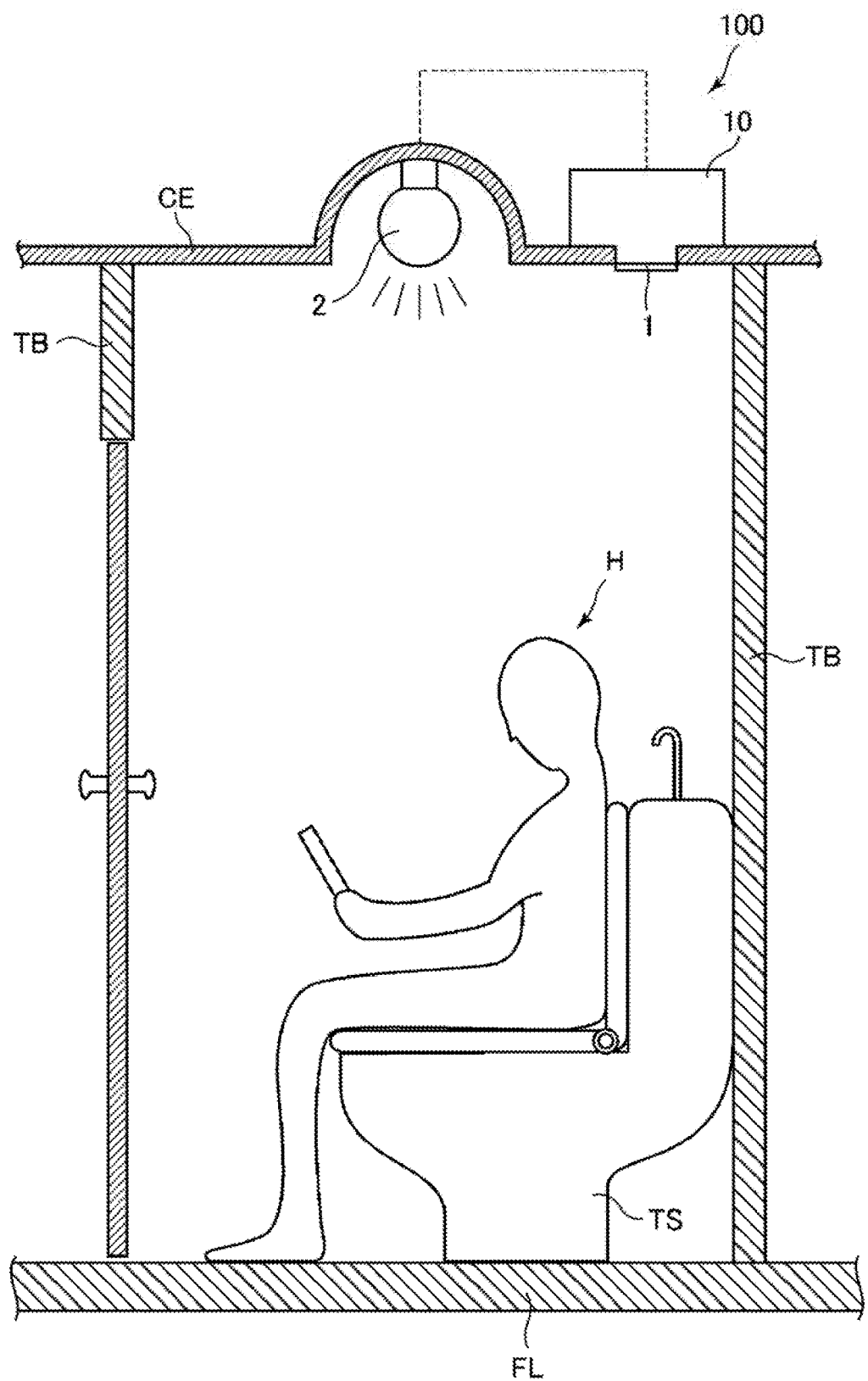
FIG. 1 is a schematic diagram illustrating a usage situation for an electronic device according to a first embodiment.

Embodiments of the disclosure will be described hereinafter with reference to the drawings. Note that in the drawings, identical or equivalent elements are given the same reference signs, and redundant descriptions thereof are not repeated.

First Embodiment

FIG. 1 is a schematic diagram illustrating a usage situation for an electronic device 100 according to the first embodiment. As can be seen from FIG. 1, the electronic device 100 according to the present embodiment is a lighting system mounted to a ceiling CE of a toilet booth TB.

In the toilet booth TB, a person H sits on a toilet seat TS installed on a floor FL. The person H has a book and is reading the book, and thus the posture of the person H hardly changes. The electronic device 100 emits light toward the person H below.

Figure 2:
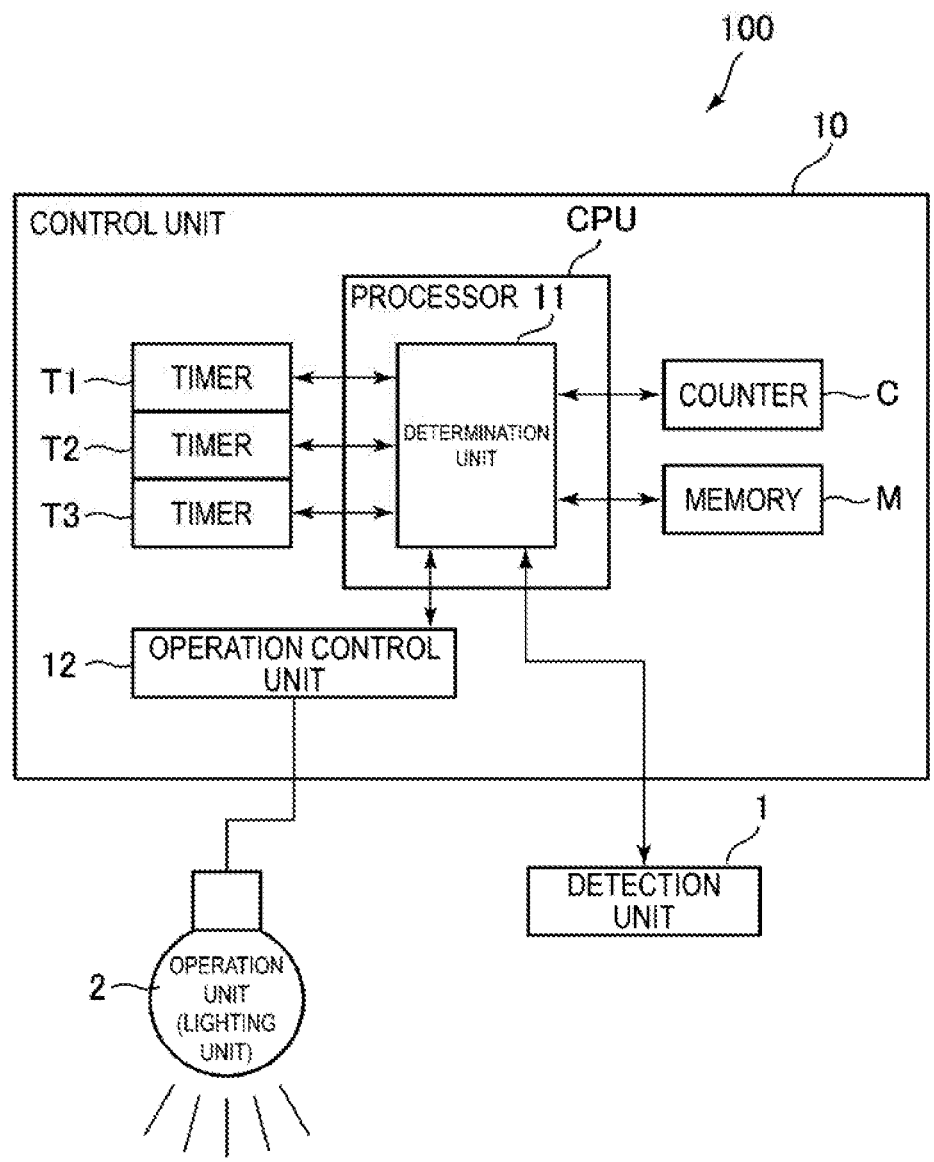
FIG. 2 is a functional block diagram of the electronic device according to the first embodiment.

FIG. 2 is a functional block diagram of the electronic device 100 according to the first embodiment. As can be seen from FIG. 2, the electronic device 100 includes a detection unit 1, an operation unit 2, and a control unit 10.

In the present embodiment, the operation unit 2 is a light bulb-type lighting unit that emits light. The operation unit 2 is not limited to a lighting unit in a lighting system, and may be any operation unit that performs some sort of operation, such as a display of a personal computer, a touch panel of a mobile phone, and a fan motor of an air purifier. Note that the light bulb that constitutes the lighting unit as the operation unit 2 can be replaced with a new light bulb after being consumed and the like.

The detection unit 1 detects movement of a person. In the present embodiment, the detection unit 1 is an infrared image sensor. The detection unit 1 detects infrared rays emitted by the person H. In this way, the detection unit 1 stores image data of the person H in an image processing unit on a time-series basis. In the present embodiment, the detection unit 1 detects whether there is movement of the person H or there is no movement of the person H, based on presence or absence of temporal change in a contour image of the image data.

Note that the detection unit 1 may not be an infrared image sensor, and may be any other detection unit that can detect movement of the person H, such as a camera or a video camera that can acquire normal color image data on a time-series basis. Further, in the present embodiment, it is assumed that the infrared image sensor as the detection unit 1 includes an imaging element that acquires image data and an image processing unit that processes the image data by extracting a contour image from the image data acquired by the imaging element and the like. However, the detection unit 1 may include the imaging element, and the control unit 10 may include the image processing unit.

The control unit 10 changes the state of the operation unit 2 based on a detection result from the detection unit 1. When the detection unit 1 detects a first movement of the person H, the control unit 10 changes the operation unit 2 from a first state to a second state. Subsequently, the control unit 10 controls the operation unit 2 so as to maintain the second state only for a first predetermined period.

In the present embodiment, the first movement of the person H is often a movement of opening a door of the toilet booth TB and entering the toilet booth TB. Further, the first state is a state where the operation unit 2 is stopped, and specifically, a state where the lighting unit is off. The second state is a state where the operation unit 2 operates, and specifically, a state where the lighting unit is on. Therefore, when the person H is in the toilet booth TB, the detection unit 1 detects the first movement of the person H and transmits a detection result to the control unit 10. In this way, the control unit 10 changes the state of the lighting unit as the operation unit 2 from an off state to an on state.

For example, the first predetermined period is a specific value within a certain range from one minute to ten minutes, for example, and is a preset value. In the present embodiment, when the first movement of the person H is not detected by the detection unit 1 within three minutes, the control unit 10 performs control for changing the operation unit 2 from the on state to the off state. This is control for preventing power from being wastefully consumed by continuation of an operation of the operation unit 2, that is, continuation of the on state of the lighting system.

In the electronic device 100 as described above, the detection unit 1 may detect a second movement of the person H in a predetermined detection period before an end time of the first predetermined period until after the end time of the first predetermined period. The second movement in this case is, for example, an operation in which the person H waves a hand, shakes a head, or the like in order to maintain the operation unit 2 in the second state, that is, in order to maintain the on state of the lighting unit.

The first movement and the second movement may not be different, and both of the first movement and the second movement may be any movement that is a movement of the person H. Note that the first movement is a movement of the person H detected by the detection unit 1 when the operation unit 2 is in the first state, for example, when the lighting unit is in the off state. The second movement is a movement of the person H detected by the detection unit 1 when the operation unit 2 is in the second state, for example, when the lighting unit is in the on state.

When the detection unit 1 detects the second movement, the control unit 10 controls the operation unit 2 so as to maintain the second state until an end of a second predetermined period extended from the first predetermined period according to an aspect of the second movement. In the electronic device 100 according to the present embodiment, the person H performs the second movement for a period longer than a certain fixed period. In this way, the second predetermined period that includes the first predetermined period and an extended period longer than the first predetermined period can be set.

Thus, the person H does not need to move every time the operation unit 2 is changed from the second state to the first state or every time a time at which the operation unit 2 is to be changed from the second state to the first state approaches. More specifically, the person H does not need to perform the movement of waving a hand, shaking a head, or the like every time the lighting unit is changed from the on state to the off state or every time immediately before the lighting unit is changed from the on state to the off state. As a result, time and effort are not required in order to maintain the operation unit 2 in the same state, that is, in order to maintain the lighting unit in the on state.

As can be seen from the above, time and effort required to maintain the electronic device 100 in the second state can be reduced by setting the second predetermined period considerably longer than a period twice as long as the first predetermined period. Note that, in the electronic device 100 according to the present embodiment, a second predetermined period shorter than the period twice as long as the first predetermined period may be set by performing the second movement for a period shorter than the certain fixed period.

In the present embodiment, the control unit 10 performs control for causing the operation unit 2 to issue an advance notification that the operation unit 2 is changed from the second state to the first state before the end time of the first predetermined period until the end time of the first predetermined period. Specifically, the control unit 10 performs control for causing the lighting unit to issue an advance notification that the lighting unit returns to the off state from the on state before the end time of the on state until the end time of the on state. The advance notification is issued by, for example, entering a state where the lighting unit is on at a luminance less than that in a normal on state, a state where the lighting unit flashes, or a state where the lighting unit is turned on with a color different from a normal color.

According to the control of the control unit 10 as described above, the person H is notified in advance by the operation of the operation unit 2 that the operation unit 2 will return to the first state from the second state before the end time of the first predetermined period. Thus, when the operation unit 2 needs to be prevented from being changed from the second state to the first state, the person H can maintain the operation unit 2 in the second state by performing the second movement. Specifically, by performing the second movement in the on state, the person H can extend the end time of the on state of the lighting unit, and can thus maintain the lighting unit in the on state.

In the present embodiment, after the end time of the on state has passed, the person H performs the second movement in order to prevent the lighting unit from continuing to be in the off state. In this way, the person H can return the lighting unit to the second state from the first state, that is, to the on state from the off state, by the second movement.

In other words, in the present embodiment, the predetermined detection period described above is both of the first period before the end time of the on state of the lighting unit until the end time, and the second period from the end time of the on state of the lighting unit until after the end time.

When the person H performs the second movement in the first period, the operation unit 2 continues to be in the second state without being changed from the second state to the first state. Specifically, when the person H waves a hand or shakes a head immediately before the end of the on state of the lighting unit, the lighting unit continues to be in the on state without being changed from the on state to the off state.

On the other hand, when the person H performs the second movement in the second period, the operation unit 2 is changed to the second state without continuing to be in the first state. More specifically, when the person H waves a hand or shakes a head immediately after the end time of the on state, that is, immediately after entering the off state, the lighting unit is changed to the on state without continuing to be in the off state.

Note that the predetermined detection period described above may be only one of the first period before the end time of the on state of the lighting unit until the end time of the on state of the lighting unit, and the second period from the end time of the on state of the lighting unit until after the end time of the on state of the lighting unit.

In the present embodiment, the control unit 10 sets a different length for the second predetermined period according to the length of a period during which the second movement continues. In other words, the length of an extended time of the on state of the lighting unit varies according to the length of a period of the movement of the person H waving a hand or shaking a head.

For example, when a person continues to wave a hand for three seconds, the on state of the lighting unit is extended for three minutes, when a person continues to wave a hand for six seconds, the on state of the lighting unit is extended for six minutes, and when a person continues to wave a hand for nine seconds, the on state of the lighting unit is extended for nine minutes. According to such a method for determining the extended time, a different length for the second predetermined period extended from the first predetermined period can be set by an intuitive second movement performed by the person H. Note that the length of the period during which the second movement continues is a total time acquired by adding each of a plurality of second movements when the plurality of second movements are detected.

Note that the control unit 10 may change the length of the second predetermined period according to the count of the second movements. In other words, the control unit 10 may set a different length of the second predetermined period for each number of times of the second movement.

Specifically, in this case, for example, each of a movement from start to stop of moving a hand or shaking a head to the left, and a movement from start to stop of moving a hand or shaking a head to the right is considered as a single second movement. Under this condition, the end time of the extended on state of the lighting unit, that is, the second predetermined period may be determined based on the count of such single second movements of the person H.

Note that the control unit 10 may change the length of the second predetermined period according to both of the length of the period during which the second movement continues and the count of the second movements. In other words, the control unit 10 may set a different length for the second predetermined period according to both of the length of the period during which the second movement continues and the count of the second movements.

As illustrated in FIG. 2, the control unit 10 includes timers T1, T2, and T3, a counter C, a determination unit 11, and an operation control unit 12. Each of the timers T1, T2, and T3 independently measures time. The control unit 10 includes a processor central processing unit (CPU) and a memory M.

The processor CPU operates the timers T1, T2, and T3, the counter C, and the operation control unit 12 based on a program stored in the memory M. The program may be initially installed in the memory M, may be installed from an external recording medium to the memory M, and also may be installed from a server to the memory M via an electrical communication network.

In the present embodiment, the timer T1 measures the first predetermined period or the second predetermined period extended from the first predetermined period in the predetermined detection period described above. The first predetermined period is, for example, a predetermined time within a range from approximately one minute to ten minutes. The second predetermined period is a different time according to at least one of a time and the count of the second movements of the person H.

The timer T2 is used for calculating a total value of the time of at least one second movement of the person H. For example, the timer T2 is used for calculating a total time of each of a plurality of second movements when the person H performs a plurality of second movements.

The timer T3 measures time for keeping an opportunity to extend the first predetermined period again after the operation unit 2 is changed from the second state to the first state, for example, after the state of the lighting unit is changed from the on state to the off state. For example, the extended time is a time of approximately five seconds. Therefore, the second predetermined period is a time of the first predetermined period+approximately five seconds.

The counter C counts the number of times the person H performs the second movement described above, for example, the count of a single one-way movement of a hand or a head of the person H to each of the right, left, front, and back. In other words, the counter C determines the count of the second movements of the person H from a stationary state to a next stationary state, that is, the count of movements from start of the second movements to stop of the second movements.

The determination unit 11 is provided in the processor CPU, and determines how to cause the operation control unit 12 to control the operation unit 2 based on information about the time measured by each of the timers T1, T2, and T3. The operation control unit 12 controls the state of the operation unit 2 based on a determination result from the determination unit 11.

In the present embodiment, the timers T1, T2, and T3 and the counter C are provided outside the processor CPU, but may be implemented by a function of the processor CPU.

The operation control unit 12 includes a driver circuit that drives the operation unit 2. Specifically, the driver circuit can adjust luminance and the color of light emitted by the lighting unit. Note that the operation control unit 12 may be implemented by a function of the processor CPU.

Figure 3:
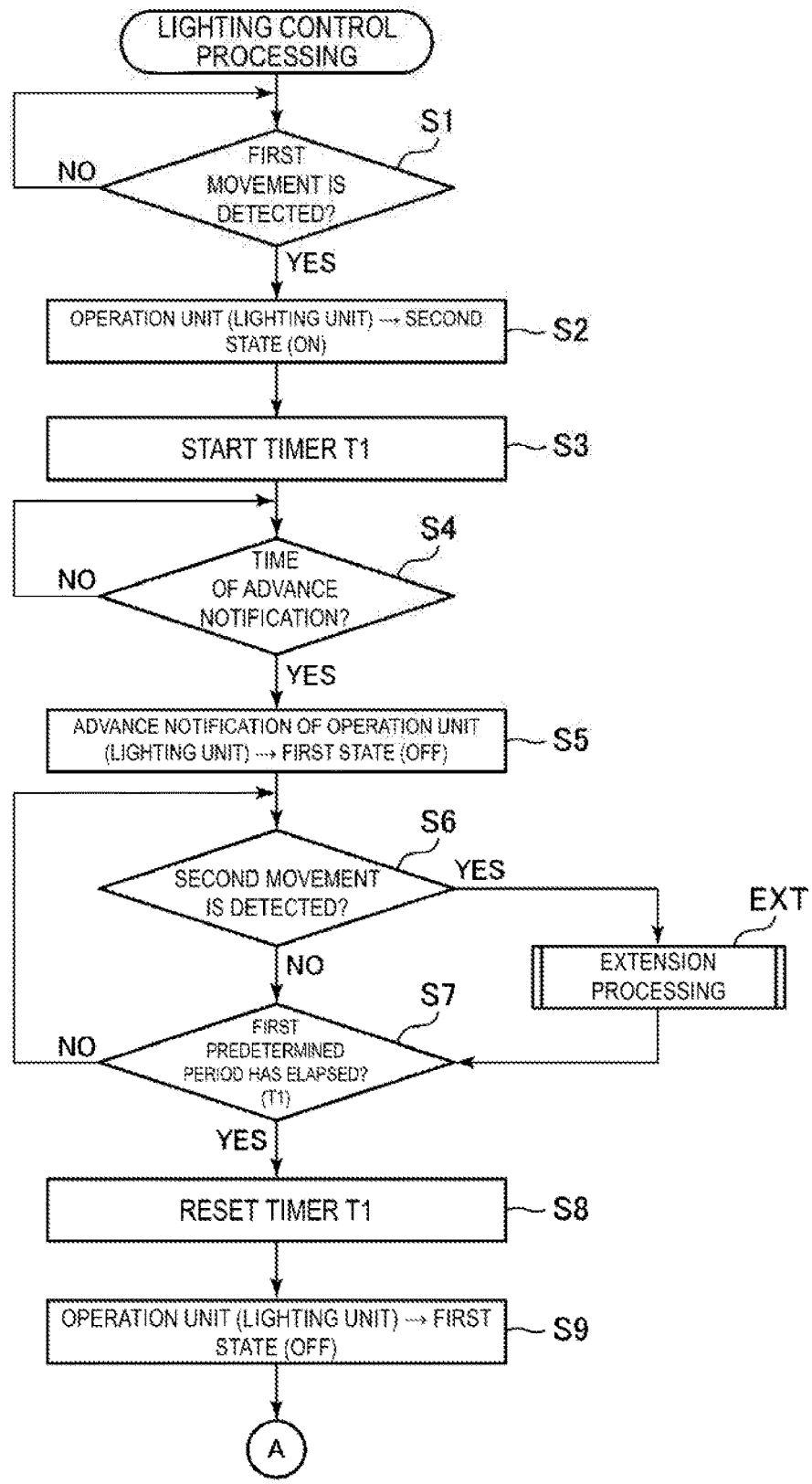
FIG. 3 is a first flowchart illustrating lighting control processing performed by a control unit of the electronic device according to the first embodiment.

Lighting control processing performed by the control unit 10 will be described by using FIGS. 3 to 6. The lighting control processing is performed based on a program stored in the memory M by the processor CPU in the control unit 10. FIG. 3 is a first flowchart illustrating the lighting control processing performed by the control unit 10 of the electronic device 100 according to the first embodiment.

In step S1, whether the detection unit 1 has detected the first movement of the person H is determined. For example, the detection unit 1 detects whether the person H has entered the toilet booth TB. Note that, although only in a rare case, even after the lighting unit as the operation unit 2 is turned off, the person H may stay in the toilet booth TB without moving for a long time. In this case, the detection unit 1 detects a movement of the person H waving a hand, shaking a head, or the like as the first movement.

In step S1, the determination unit 11 may determine that the detection unit 1 has detected the first movement of the person H. In this case, in step S2, the processor CPU causes the operation control unit 12 to change the operation unit 2 from the first state to the second state, that is, to change the lighting unit from the off state to the on state. In step S1, when the determination unit 11 determines that the detection unit 1 has not detected the first movement of the person H, the processor CPU repeats the processing in step S1. In other words, the processor CPU maintains the lighting unit in the off state.

Subsequently, in step S3, the processor CPU starts the timer T1. Next, in step S4, the determination unit 11 determines whether a time from a start of the timer T1 to the advance notification described above has elapsed. In step S4, when the determination unit 11 determines that the time from the start of the timer T1 to the advance notification described above has not elapsed, the processor CPU repeats the processing in step S4.

In step S4, when the determination unit 11 determines that the time from the start of the timer T1 to the advance notification described above has elapsed, in step S5, the operation control unit 12 performs control for causing the lighting unit to issue the advance notification. Thus, the predetermined detection period described above starts. This is also the start of the first period described above.

Note that, in the present embodiment, the processing for the advance notification of turning off the lighting unit is performed only in step S4 and step S5. However, the processing for the advance notification of turning off the lighting unit may be performed later within the predetermined detection period described above.

Specifically, the operation control unit 12 changes the on state as the second state of the lighting unit as the operation unit 2 to an on state (third state) having a lower brightness level. In this way, the lighting unit issues the advance notification that the end of lighting is approaching. With the advance notification, the person H realizes that the end time of the on state is approaching, that is, that an off time is approaching.

Subsequently, in step S6, the determination unit 11 determines whether the detection unit 1 has detected the second movement of the person H. In step S6, when the determination unit 11 determines that the detection unit 1 has not detected the second movement of the person H, the determination unit 11 determines whether the first predetermined period has elapsed from the start of the timer T1 in step S7. In this way, the first period described above ends.

In step S7, the determination unit 11 may determine that the first predetermined period has not elapsed from the start of the timer T1. In this case, the control unit 10 repeats the processing in step S6 and step S7.

On the other hand, in step S7, the determination unit 11 may determine that the first predetermined period has elapsed from the start of the timer T1. In this case, in step S8, the processor CPU resets the timer T1. Subsequently, in step S9, the processor CPU causes the operation control unit 12 to turn off the lighting unit as the operation unit 2.

Further, in step S6, the determination unit 11 may determine that the detection unit 1 has detected the second movement of the person H. In this case, the control unit 10 performs an extension processing EXT illustrated in FIG. 4.

Figure 4:
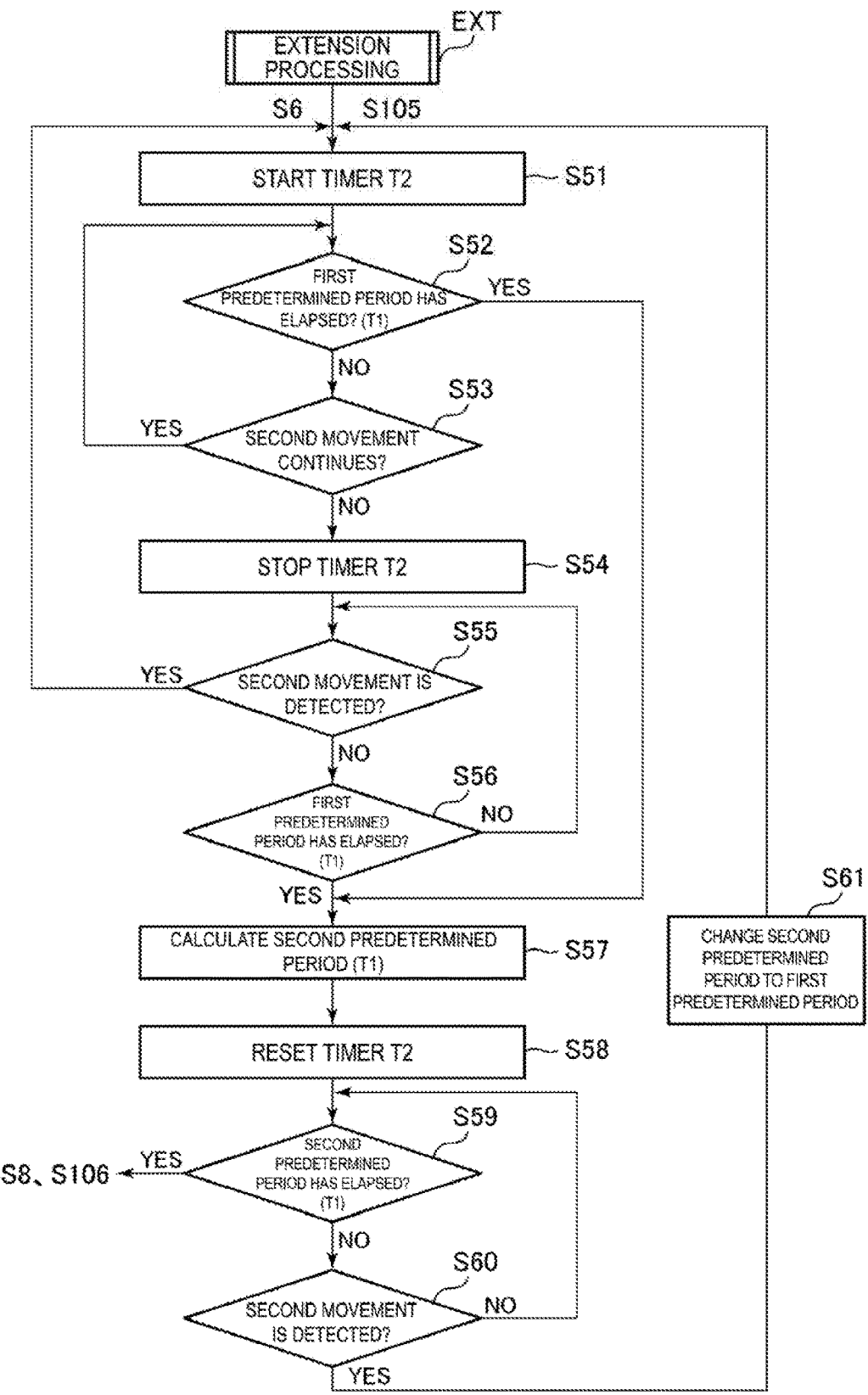
FIG. 4 is a second flowchart illustrating the lighting control processing performed by the control unit of the electronic device according to the first embodiment.

FIG. 4 is a second flowchart illustrating the lighting control processing performed by the control unit 10 of the electronic device 100 according to the first embodiment.

As illustrated in FIG. 4, in the extension processing EXT, in step S51, the processor CPU starts the timer T2. Subsequently, the determination unit 11 determines whether the first predetermined period has elapsed from the start of the timer T1. Note that, although not illustrated, after step S51, the advance notification of the off state may be made by performing processing similar to the processing in step S4 and step S5.

In step S52, when the determination unit 11 determines that the first predetermined period has elapsed from the start of the timer T1, the processor CPU calculates the second predetermined period based on a total time measured by the timer T2 in step S57. On the ether hand, in step S52, when the determination unit 11 determines that the first predetermined period has not elapsed from the start of the timer T1, the processor CPU performs the processing in step S53.

In step S53, the determination unit 11 determines whether the second movement of the person H continues by using the detection unit 1. In the present embodiment, whether the second movement continues is determined based on whether an extracted contour image is continuously changing. Information about whether the contour image is continuously changing is transmitted from the detection unit 1 to the determination unit 11. In step S53, when the determination unit 11 determines that the second movement of the person H continues, the processor CPU repeats the processing in step S52 and step S53.

With the processing in steps S51 to S53, the timer T2 is brought into a state of measuring a time during which the second movement of the person H detected by the detection unit 1 continues until the first predetermined period elapses. A total time during which the second movement continues may be a measured time of one series of movements. However, when a plurality of second movements are intermittently detected, a total time during which the second movement continues may be a total value of the time of the plurality of second movements.

On the other hand, in step S53, when the determination unit 11 determines that the second movement of the person H does not continue, the processor CPU stops the timer T2 in step S54. The stop of the timer T2 refers to a state where the timer T2 stops with the already measured time being stored. Therefore, the stopped timer T2 adds a new measured time to the already measured time when the time measurement is resumed.

Subsequently, in step S55, the determination unit 11 determines whether the detection unit 1 has detected the second movement of the person H again. In step S55, when the determination unit 11 determines that the detection unit 1 has detected the second movement of the person H, the control unit 10 repeats the processing in steps S51 to S55.

On the other hand, in step S55, when the determination unit 11 determines that the detection unit 1 has not detected the second movement of the person H, the processor CPU performs the processing in step S56. In step S56, the determination unit 11 determines whether the first predetermined period has elapsed from the start of the timer T1.

In step S56, when the determination unit 11 determines that the first predetermined period has not elapsed from the start of the timer T1, the processor CPU repeats the processing in step S55 and step S56. On the other hand, in step S56, when the determination unit 11 determines that the first predetermined period has elapsed from the start of the timer T1, the processor CPU performs the processing in step S57.

In step S57, the processor CPU calculates the second predetermined period based on the time measured by the timer T2. The second predetermined period is a time extended from the first predetermined period. Specifically, the processor CPU determines an extended time of the on state of the lighting unit as the operation unit 2 based on a total value of the measured time of the timer T2 in a case where the determination unit 11 determines that the detection unit 1 has detected the second movement of the person H. The total value of the extended time and the first predetermined period is the second predetermined period.

The processor CPU performs the processing in step S58 after replacing the first predetermined period as a determination reference of the measured time of the timer T1 with the second predetermined period. For example, when a first predetermined period of three minutes is extended by six minutes, a second predetermined period of nine minutes is used as the determination reference of the measured time of the timer T1.

Next, in step S58, the processor CPU resets the timer T2. Subsequently, in step S59, the determination unit 11 determines whether the second predetermined period has elapsed from the start of the timer T1. In step S59, the determination unit 11 may determine that the second predetermined period has not elapsed from the start of the timer T1. In this case, in step S60, the determination unit 11 determines whether the detection unit 1 has detected the second movement of the person H.

On the other hand, in step S59, the determination unit 11 may determine that the second predetermined period has elapsed from the start of the timer T1. In this case, the processor CPU performs the processing in step S8 when step S6 transitions to the extension processing EXT. On the other hand, the processor CPU performs the processing in step S106 when step S105 transitions to the extension processing EXT.

In step S60, when the determination unit 11 determines that the detection unit 1 has not detected the second movement of the person H, the processor CPU repeats the processing in step S59 and step S60. On the other hand, in step S60, the determination unit 11 may determine that the detection unit 1 has detected the second movement of the person H.

In this case, in step S61, the processor CPU repeats the processing in steps S51 to S61 after replacing the second predetermined period as the determination reference of the measured time of the timer T1 with the first predetermined period. For example, in a case where a second predetermined period of nine minutes is the determination reference, a first predetermined period of nine minutes is used as the determination reference of the measured time of the timer T1.

The processing in steps S1 to S9 and steps S51 to S61 illustrated in FIGS. 3 and 4 described above is processing capable of preventing the operation unit 2 from being changed from the second state to the first state. In other words, the processing in steps S1 to S9 and steps S51 to S61 described above is processing capable of preventing the lighting unit from being changed from the on state to the off state.

Figure 5:
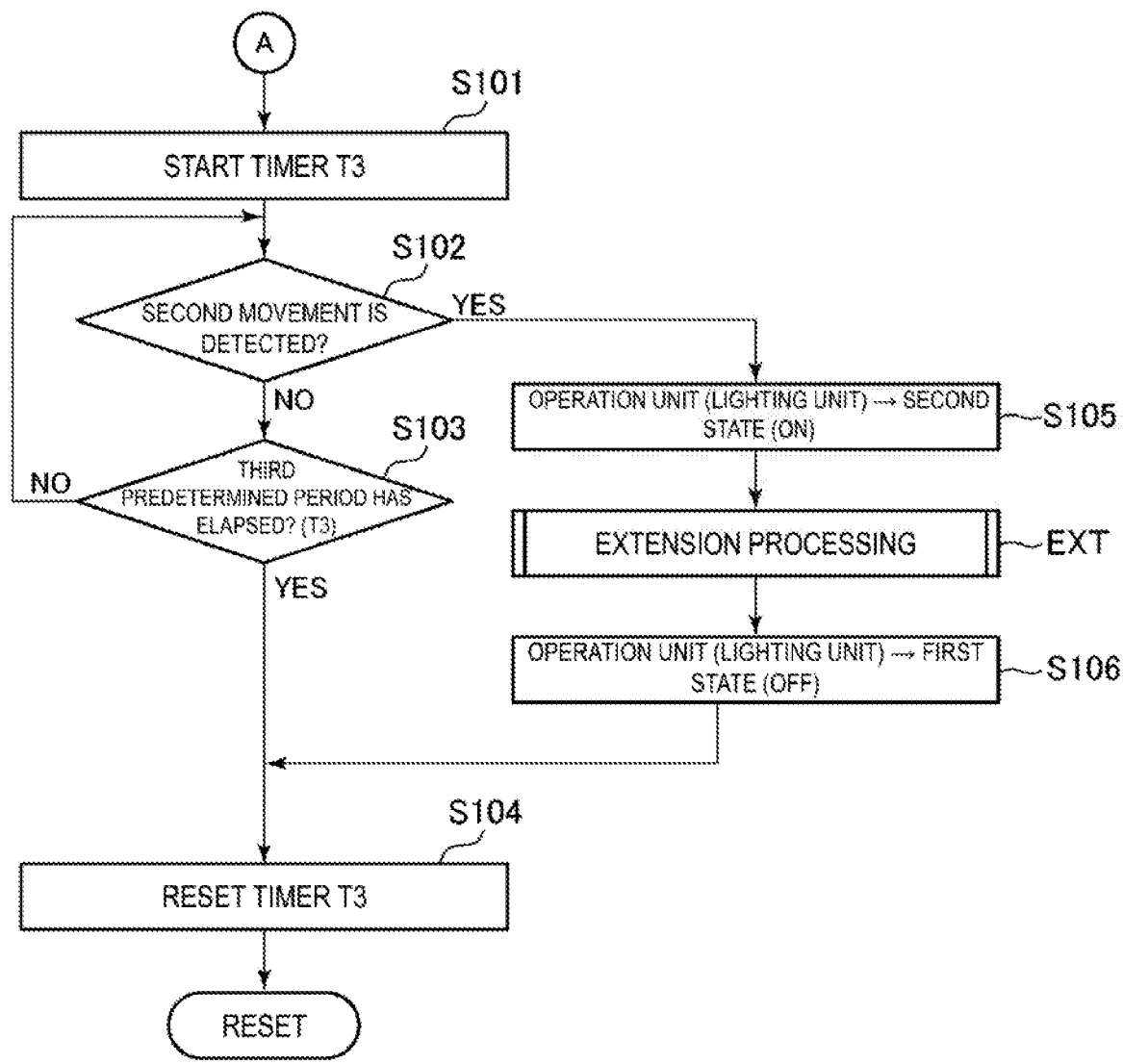
FIG. 5 is a third flowchart illustrating the lighting control processing performed by the control unit of the electronic device according to the first embodiment.

FIG. 5 is a third flowchart illustrating the lighting control processing performed by the control unit 10 of the electronic device 100 according to the first embodiment.

The processing in steps S101 to S104 described later with reference to FIG. 5 is processing for returning the operation unit 2 to the second state from the first state after changing the operation unit 2 from the second state to the first state. Specifically, the processing in steps S101 to S104 described later with reference to FIG. 5 is processing for returning the lighting unit to the on state from the off state after changing the lighting unit from the on state to the off state.

In step S101, the processor CPU starts the timer T3. In this way, the second period described above starts. Note that, when a time measured by the timer T3 is a relatively long time, although not illustrated, after step S101, an advance notification of turning off the lighting unit may be issued by performing processing similar to the processing in step S4 and step S5.

Next, in step S102, the determination unit 11 determines whether the detection unit 1 has detected the second movement of the person H. In step S102, the determination unit 11 may determine that the detection unit 1 has not detected the second movement of the person H. In this case, in step S103, the determination unit 11 determines whether the third predetermined period has elapsed from a start of the timer T3.

This third predetermined period is a time of approximately five seconds and the like that is a much shorter than the first predetermined period (for example, three minutes). The reason is that the processing in steps S101 to S106 is processing for keeping an opportunity to extend the on state of the lighting unit only for a short period immediately after the end time of the on state of the lighting unit. Note that a length of the third predetermined period is not limited to the time much shorter than the first predetermined period (for example, three minutes).

In step S103, when the determination unit 11 determines that the third predetermined period has not elapsed from the start of the timer T3, the processor CPU repeats the processing in steps S102 to S103.

On the other hand, in step S103, the determination unit 11 may determine that a third predetermined period has elapsed from the start of the timer T3. In this way, the predetermined detection period ends. This is also the end of the second period. In this case, the processor CPU resets the timer T3 in step S104. Subsequently, the processor CPU performs step S101 illustrated in FIG. 3.

Further, in step S102, the determination unit 11 may determine that the detection unit 1 has detected the second movement of the person H. In this case, in step S105, the processor CPU causes the operation control unit 12 to change the operation unit 2 from the first state to the second state, that is, to change the lighting unit from the off state to the on state. Subsequently, the processor CPU performs the extension processing EXT described above illustrated in FIG. 4.

Next, in step S106, the processor CPU causes the operation control unit 12 to change the operation unit 2 from the second state to the first state, that is, to change the lighting unit from the on state to the off state. Subsequently, the processor CPU performs the processing in step S104.

Electronic Device According to Modification Example of First Embodiment

Figure 6:
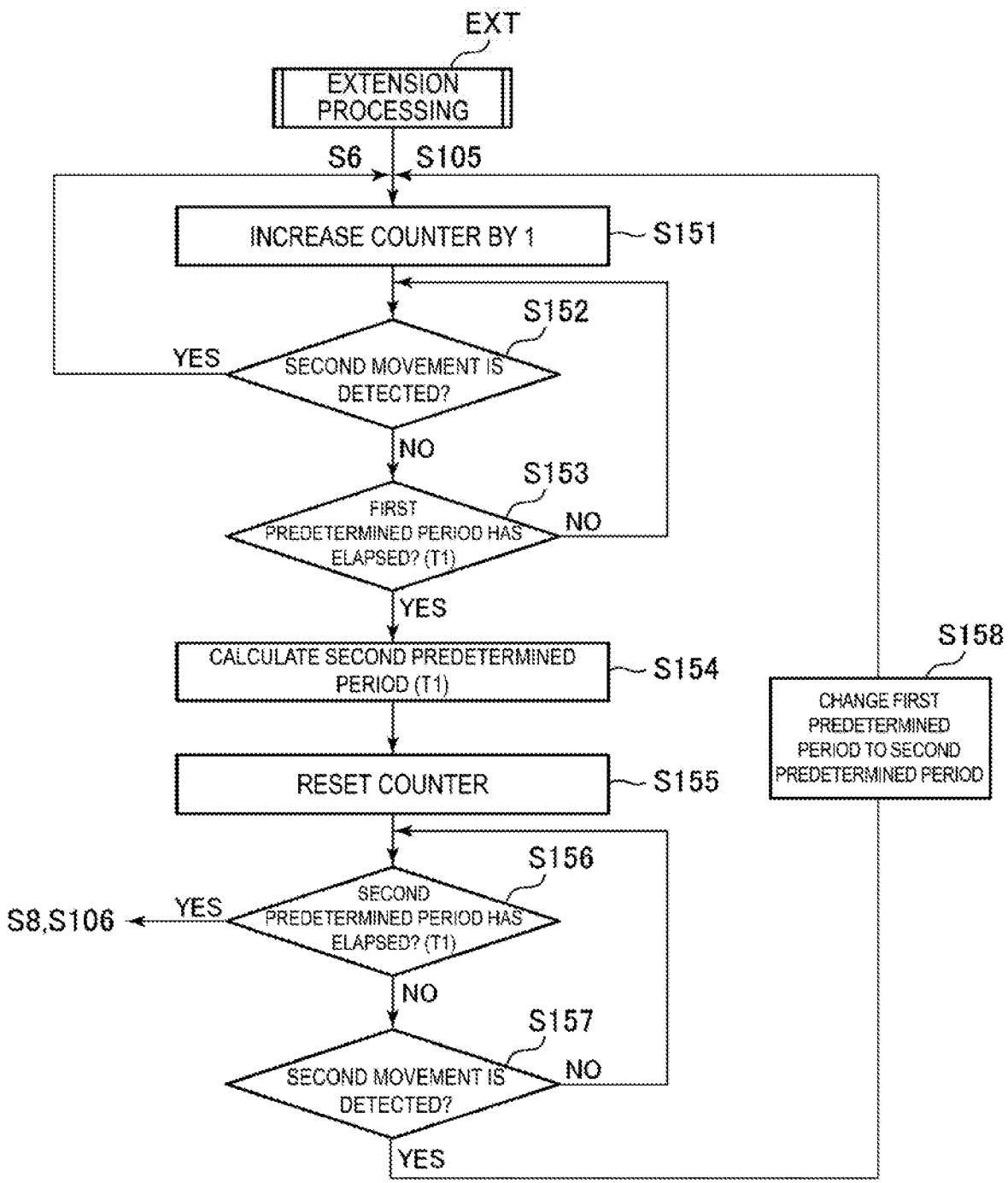
FIG. 6 is a flowchart illustrating the lighting control processing performed by the control unit of the electronic device according to a modification example of the first embodiment.

FIG. 6 is a flowchart illustrating the lighting control processing performed by the control unit 10 of the electronic device 100 according to a modification example of the first embodiment.

In the electronic device 100 according to the modification example of the first embodiment, the processor CPU performs the processing in steps S151 to S157 illustrated in FIG. 6 instead of steps S51 to S61 illustrated in FIG. 4 as the extension processing EXT. The extension processing EXT is performed when the detection unit 1 has detected the second movement of the person H in step S6 illustrated in FIG. 3.

Note that, although not illustrated in FIG. 6, before step S151, the advance notification of turning off the lighting unit may be performed by performing processing similar to the processing in step S4 and step S5.

In the extension processing EXT illustrated in FIG. 6, first, in step S151, the processor CPU increases a value of the counter C by "1". Subsequently, in step S152, the determination unit 11 determines whether the detection unit 1 has detected the second movement of the person H.

In step S152, when the determination unit 11 determines that the detection unit 1 has detected the second movement of the person H, the processor CPU repeats the processing in steps S151 to S152. In this way, the counter C counts the second movement of the person H.

On the other hand, in step S152, when the determination unit 11 determines that the detection unit 1 has not detected the second movement of the person H, the processor CPU performs the processing in step S153. In step S153, the determination unit 11 determines whether the first predetermined period has elapsed from the start of the timer T1. In step S153, when the determination unit 11 determines that the first predetermined period has not elapsed from the start of the timer T1, the processor CPU repeats the processing in step S152 and step S153.

On the other hand, in step S153, when the determination unit 11 determines that the first predetermined period has elapsed from the start of the timer T1, the processor CPU performs the processing in step S154. In other words, the counter C continues to count the second movement of the person H until the first predetermined period has elapsed.

In step S154, the processor CPU calculates the second predetermined period. The second predetermined period is a time extended from the first predetermined period. Specifically, the processor CPU determines the extended time of the on state of the lighting unit as the operation unit 2 based on a total value of the number of times the counter C increases. The counter C increases when the determination unit 11 determines that the detection unit 1 has detected the second movement of the person H. A total time of the extended time determined based on the count of the counter C and the first predetermined period is the second predetermined period. The processor CPU performs the processing in step S155 after replacing the first predetermined period as a determination reference of the measured time of the timer T1 with the second predetermined period. For example, when a first predetermined period of three minutes is extended by six minutes, a second predetermined period of nine minutes is used as the determination reference of the measured time of the timer T1.

Next, in step S155, the processor CPU resets the counter C. Subsequently, in step S156, the determination unit 11 determines whether the second predetermined period has elapsed from the start of the timer T1. In step S156, when the determination unit 11 determines that the second predetermined period has not elapsed from the start, of the timer T1, the determination unit 11 determines whether the detection unit 1 has detected the second movement of the person H in step S157.

On the other hand, in step S156, the determination unit 11 may determine that the second predetermined period has elapsed from the start of the timer T1. In this case, the processor CPU performs the processing in step S8 when step S6 transitions to the extension processing EXT. Further, the processor CPU performs the processing in step S106 when step S105 transitions to the extension processing EXT.

In step S157, when the determination unit 11 determines that the detection unit 1 has not detected the second movement of the person H, the processor CPU repeats the processing in step S156 and step S157. On the other hand, in step S157, the determination unit 11 may determine that the detection unit 1 has detected the second movement of the person H.

In this case, in step S156, the processor CPU repeats the processing in steps S151 to S158 after replacing the second predetermined period as the determination reference of the measured time of the timer T1 with the first predetermined period. For example, in a case where a second predetermined period of nine minutes is the determination reference, a first predetermined period of nine minutes is used as the determination reference of the measured time of the timer T1.

Second Embodiment

Next, a second embodiment will be described. Note that points similar to those in the first embodiment will not be repeated in the following description. The present embodiment is different from the first embodiment in that the electronic device 100 is a personal computer. Only differences between the present embodiment and the first embodiment will be described below.

Figure 7:
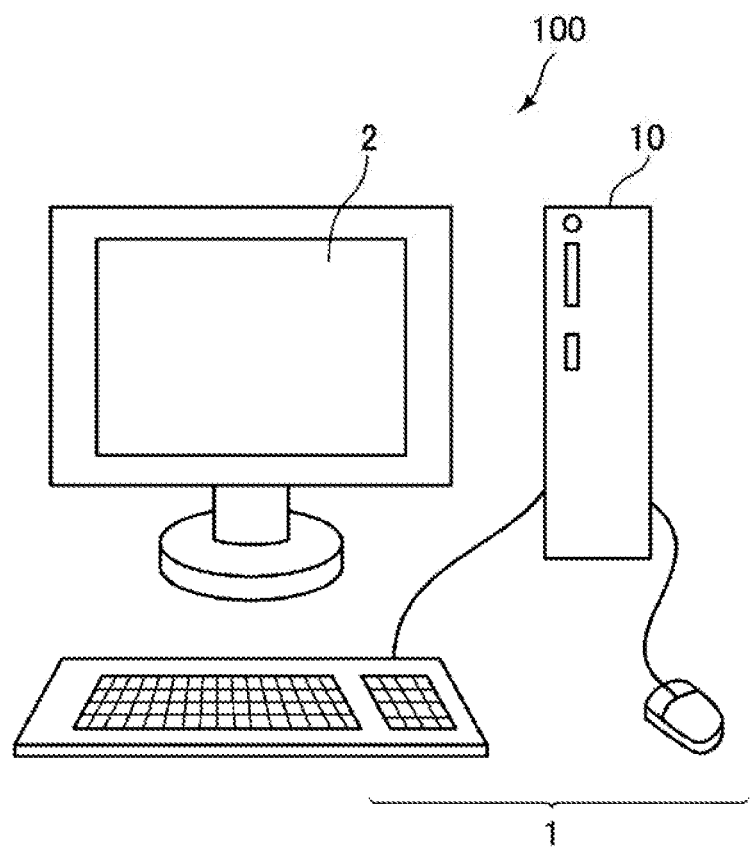
FIG. 7 is a schematic diagram illustrating an electronic device according to a second embodiment.

FIG. 7 is a schematic diagram illustrating the electronic device 100 according to the second embodiment. The electronic device 100 according to the present embodiment is a personal computer. The detection unit 1 includes a mouse for moving a pointer on a display of the personal computer, or a keyboard for displaying text information on the display. The operation unit 2 includes the display. The control unit 10 is incorporated into the personal computer, and includes the timers T1, T2, and T3, the counter C, the processor CPU, the memory M, and the operation control unit 12 similar to those in the first embodiment.

The personal computer as the electronic device 100 according to the present embodiment controls the display as the operation unit 2 in an off state as a first state in order to reduce power consumption. At this time, the control unit 10 of the personal computer detects, as a first movement, that the mouse as the operation unit 2 has moved or that the keyboard as the operation unit 2 has been operated. In this way, the control unit 10 of the personal computer sets the display as the operation unit 2 in an on state as a second state.

Further, the control unit 10 of the personal computer reduces brightness of the display further than that in a normal condition immediately before the display enters an off state to notify a user that an end time of the on state is approaching.

Furthermore, the personal computer may detect, as a second movement, that the mouse has moved or that the keyboard has been operated during the on state or immediately after the on state ends. In this case, the control unit 10 of the personal computer extends the on state of the display, or returns the display to the on state from the off state until the extended time ends.

Also in the present embodiment, the detection unit 1 may detect the second movement of the person H in a predetermined detection period before an end time of a first predetermined period until after the end time. In this case, the control unit 10 controls the operation unit 2 so as to maintain the second state until an end of a second predetermined period extended from the first predetermined period according to the aspect of the second movement.

The aspect of the second movement is a time or count of the movement of the mouse, or a time or count of tapping a key of the keyboard. Thus, the personal computer as the electronic device 100 according to the present embodiment also does not require much time and effort in order to maintain the display as the operation unit 2 in the same state (on state).

Third Embodiment

Next, a third embodiment will be described. Note that points similar to those in the first embodiment will not be repeated in the following description. The present embodiment differs from the first embodiment in that the electronic device 100 is a mobile communication terminal.

Figure 8:
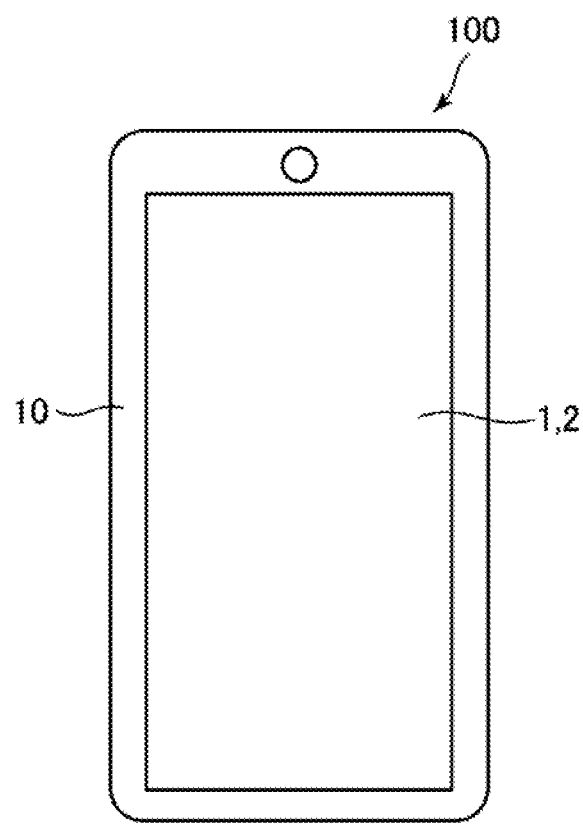
FIG. 8 is a schematic diagram illustrating an electronic device according to a third embodiment.

FIG. 8 is a schematic diagram illustrating the electronic device 100 according to the third embodiment. The electronic device 100 according to the present embodiment is the mobile communication terminal, and more specifically, a smartphone. The detection unit 1 includes a touch panel of the smartphone operated by a finger of a person. The operation unit 2 also includes the touch panel. In other words, in the present embodiment, the touch panel of the smartphone performs functions of both of the detection unit 1 and the operation unit 2. The control unit 10 is incorporated into the smartphone, and includes the timers T1, T2, and T3, the counter C, the processor CPU, the memory M, and the operation control unit 12 similar to those in the first embodiment.

The smartphone as the electronic device 100 according to the present embodiment controls a display as the operation unit 2 in an off state as a first state in order to reduce power consumption. At this time, the control unit 10 of the smartphone detects, as a first movement, that the touch panel as the operation unit 2 has been operated by a finger of the person H. In this way, the control unit 10 of the smartphone sets the display as the operation unit 2 in an on state as a second state.

Further, brightness of the display of the smartphone is reduced further than that in a normal condition immediately before the display enters the off state to notify a user that an end time of the on state is approaching.

Furthermore, the touch panel as the detection unit 1 of the smartphone may detect, as a second movement, that the touch panel has been operated during the on state or immediately after the on state ends. In this case, the control unit 10 of the touch panel extends the on state of the display, or returns the display to the on state from the off state until the extended time ends.

Also in the present embodiment, the detection unit 1 may detect the second movement of the person H in a predetermined detection period before an end time of a first predetermined period until after the end time. In this case, the control unit 10 controls the operation unit 2 so as to maintain the second state until an end of a second predetermined period extended from the first predetermined period according to the aspect of the second movement, and more specifically, a touch operation time or count of a touch operation of the touch panel. Thus, the smartphone as the electronic device 100 according to the present embodiment also does not require much time and effort in order to maintain the touch panel as the operation unit 2 in the same state (on state).

Fourth Embodiment

Next, a fourth embodiment will be described. Note that points similar to those in the first embodiment will not be repeated in the following description. The present embodiment is different from the first embodiment in that the electronic device 100 is an air purifier.

The air purifier according to the present embodiment generates ions and diffuses the ions into the room to sterilize air. Thus, the air purifier is controlled to be in an operating state when a person is not near the air purifier, and is controlled to be in a stopped state when a person is near the air purifier.

Figure 9:
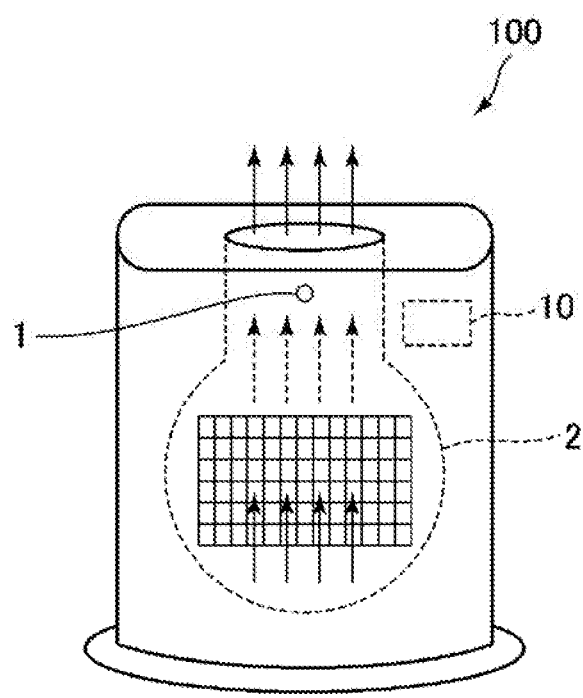
FIG. 9 is a schematic diagram illustrating an electronic device according to a fourth embodiment.

FIG. 9 is a schematic diagram illustrating the electronic device according to the fourth embodiment. The electronic device 100 according to the present embodiment is the air purifier. The detection unit 1 is an infrared image sensor similar to that in the first embodiment. The operation unit 2 includes a fan and a fan motor. The control unit 10 is incorporated into the air purifier, and includes the timers T1, T2, and T3, the counter C, the processor CPU, the memory M, and the operation control unit 12 similar to those in the first embodiment.

The air purifier as the electronic device 100 according to the present embodiment controls the fan motor as the operation unit 2 to be in the stopped state as a first state. At this time, in the air purifier, a person is detected as a first movement by the infrared image sensor as the detection unit 1. In this way, the air purifier sets the fan motor in the operating state as a second state.

Further, the air purifier notifies a user that an end time of the operating state of the fan motor is approaching by rotating the fan motor at a rotation speed less than that in a normal condition immediately before the fan motor as the operation unit 2 enters the operating state.

Furthermore, the air purifier extends the stopped state or returns to the stopped state until an extended time ends when a second movement of the person is detected by the infrared image sensor during the stopped state or immediately after the stopped state ends.

Also in the present embodiment, the detection unit 1 may detect the second movement of the person H in a predetermined detection period before an end time of a first predetermined period until after the end time. In this case, the control unit 10 controls the operation unit 2 so as to maintain the second state (stopped state) until an end of a second predetermined period extended from the first predetermined period according to the aspect of the second movement, and more specifically, a length of time or the number of times the person H is detected by the detection unit 1. Thus, the air purifier as the electronic device 100 according to the present embodiment also does not require much time and effort in order to maintain the fan motor as the operation unit 2 in the same state (stopped state).

Fifth Embodiment

Next, a fifth embodiment will be described. Note that points similar to those in the first embodiment will not be repeated in the following description. The present embodiment is different from the first embodiment in the following ways.

Also in the present embodiment, the detection unit 1 may detect the second movement of the person H in the predetermined detection period described above. In this case, in the present embodiment, the control unit 10 controls the operation unit 2 so as to maintain the second state until an end of a second predetermined period reduced from the first predetermined period according to the aspect of the second movement. Specifically, in step S57 in FIG. 4 or step S154 in FIG. 6, the control unit 10 shortens the second predetermined period further than the first predetermined period. In this way, the time of returning to the second state from the first state can be brought forward. Note that the second predetermined period can be shorter than the first predetermined period when a remaining time of the first predetermined period sufficiently remains.

In this way, the second predetermined period may be a period acquired by extending the first predetermined period or reducing the first predetermined period, as long as the period is changed from the first predetermined period.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electronic device of a lighting system mounted to a ceiling of a toilet booth comprising:
   a detection unit configured to detect movement of a person within the toilet booth; wherein when the movement of the person is detected, the lighting system emits light toward the person; and
   a control unit configured to, in a case where the detection unit detects a first movement of the person, control an operation unit of the lighting system such that the operation unit is changed from a first state, of not emitting light, to a second state of emitting light, and maintains the second state for a first predetermined period, wherein,
   in a case where the detection unit detects a second movement of the person for maintaining the operation unit in the second state, in a predetermined detection period spanning from before an end time of the first predetermined period until after the end time, the control unit controls the operation unit such that the operation unit maintains the second state until an end of a second predetermined period changed from the first predetermined period and directly lasting based on a time aspect of the second movement of the person,
   in a case where the first predetermined period ends and the operation unit is changed from the second state to the first state, the control unit determines whether a third predetermined period has elapsed, and
   in a case where the detection unit detects the second movement during the third predetermined period, the first state is changed to the second state and the second state is maintained for the second predetermined period.

2. The electronic device according to claim 1, wherein the control unit controls the operation unit in a state of issuing an advance notification that the operation unit returns to the first state from the second state in the predetermined detection period.

3. The electronic device according to claim 1, wherein the predetermined detection period is at least one of a first period before the end time until the end time or a second period from the end time until after the end time.

4. The electronic device according to claim 1, wherein the control unit changes a length of the second predetermined period according to at least one of a count of the second movement or a length of a period during which the second movement continues.

5. The electronic device according to claim 1, wherein the first state is a state where the operation unit is stopped and the second state is a state where the operation unit operates, or the first state is a state where the operation unit operates and the second state is a state where the operation unit is stopped.

* * * * *